3,238,217
AZASPIRANES
Charles H. Grogan, Falls Church, Va., and Leonard M. Rice, Baltimore, Md., assignors to The Geschickter Fund for Medical Research, Washington, D.C., a corporation of New York
No Drawing. Filed Sept. 7, 1961, Ser. No. 136,456
7 Claims. (Cl. 260—294.7)

This application is a continuation-in-part of application 113,137, filed May 29, 1961, now abandoned.

The present invention relates to novel heterocyclic nitrogen compounds having medicinal usefulness. More specifically, this invention relates to azaspiranes and to methods for their synthesis.

The several inventions of the present application have a number of significant objects. A primary object of these inventions is to provide novel, pharmacologically active organic compounds and methods for their preparation, said compounds being characterized by their central nervous system activity.

It is another principal object of the present inventions to provide novel azaspiranes having the medicinal activity set forth above, their ring- and N-substituted derivatives, the simple acid addition and quaternary salts thereof, and methods for their preparation.

It is a further object of the present invention to provide a novel group of azaspiranes substituted on the aza atom of the spirane nucleus by a variety of ketones.

It is still another object of the present invention to provide a novel group of azaspiranes which have markedly improved tranquilizing properties with a totally unexpected degree of potency, said azaspiranes being characterized by being substituted on the aza atom of the spirane by fluorinated aralkylketones.

These and further objects of the several inventions presented in the instant application will become more apparent by reference to the ensuing description and appended claims.

Formula 1 illustrates the general structural formula of the novel azaspirane bases of the present invention:

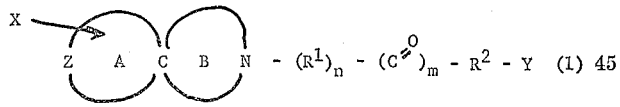

In this formula, the novel azaspirane structure consists of six essential elements: (a) the ring A; (b) the ring B; (c) the spiro carbon atom connecting rings A and B; (d) the substituent X on ring A; (e) the constituent Z in ring A; and (f) the substituent

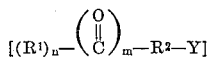

on ring B.

Ring A comprises a mono or polycyclic ring of at least 5 atoms. While there is no particular limit on the number of atoms in ring A, a ring of from 5–15 atoms is preferred. Ring B comprises a saturated heterocyclic ring containing 5 or 6 atoms, one of which is nitrogen, the nitrogen atom being at least one carbon atom removed from the spiro carbon atom. The other atoms of ring B are preferably carbon atoms. Element (d), namely, substituent X on ring A, represents one or more atoms and/or radicals of the group consisting of hydrogen, alkyl, alkenyl and alkoxy (the latter three preferably containing 1–6 atoms in the chain). Constituent Z in ring A is an atom selected from the group consisting of carbon, oxygen or sulfur. In element (f), $R^1$ is selected from the group consisting of alkylene and alkenylene radicals, $n$ is a number from 0–6, $m$ is a number from 0–1, $R^2$ is a radical selected from the group consisting of cycloalkyl, homocyclic aryl and heterocyclic aryl, and Y is a substituent on $R^2$ selected from the group consisting of alkyl, alkenyl, alkoxy (preferably containing 1–6 atoms in the chain), hydrogen, chlorine, bromine, iodine, and fluorine.

Generally speaking, any cycloalkyl, homocyclic aryl and heterocyclic aryl substituent may be present, provided only that the solubility and chemical stability of the reactant (viz., the amine or halogen ester) containing the $R^2$ substituent is such as to permit that reactant to react under the prevailing reaction conditions to form the desired spiranes.

As was the case in applicants' copending applications 43,747 and 43,719, both filed July 19, 1960, which are now U.S. Patents 3,150,143 and 3,106,552, respectively, the azaspiranes of the present invention may be prepared by first forming the imide corresponding to the desired azaspirane and then reducing the imide.

Generally speaking, the azaspirane imide intermediates may be synthesized by reacting equimolar quantities (or a slight excess of the amine) of a cyclic-gem-carboxy-acetic or cyclic-gem-diacetic acid anhydride and a suitable primary amine and heating sufficiently to cyclize the amic acid thus formed to the imide or azadione. A cyclizing temperature of approximately 160–240° C. is acceptable, with a temperature range of 180–220° C. being preferred.

The azaspirane bases may be prepared, as above stated, by reducing the imides thus formed by suitable means.

The reactions involved may be generally represented as follows:

A. Using a cyclic-gem-carboxy-acetic acid anhydride:

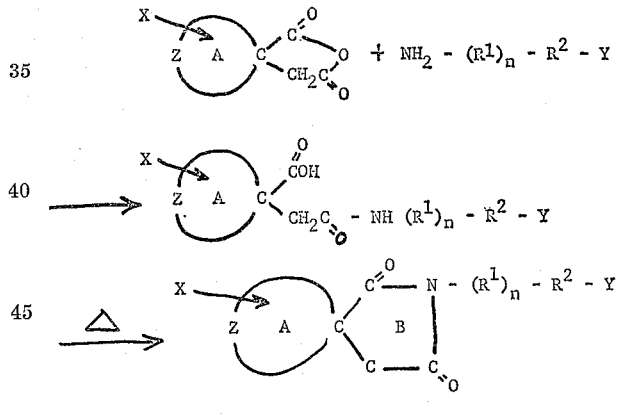

B. Using a cyclic-gem-diacetic acid anhydride:

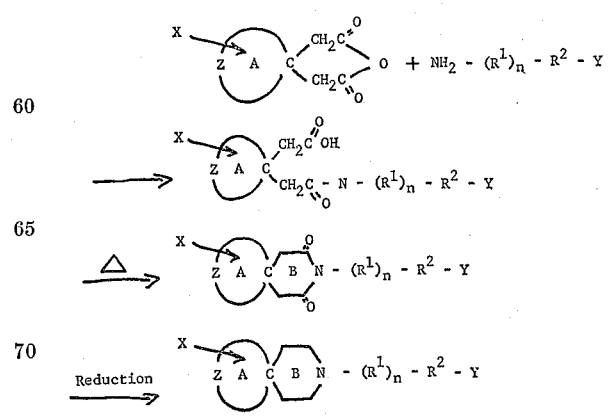

The values of the various constituents and substituents are those set forth above.

It will be noted that no carbonyl group is included in the ring B substituent in the equations set forth above. The reason for this omission is that the carbonyl group tends to be reduced when the imide is reduced to the azaspirane and, therefore, the foregoing procedure is not particularly effective to produce an azaspirane containing a carbonyl group in the ring-B substituent. Instead, the present invention contemplates an alternative method of producing the carbonyl-containing azaspirane bases, which method involves reacting a free azaspirane secondary amine with a suitable halogen ester in an inert solvent such as benzene, the xylenes or toluene, as follows:

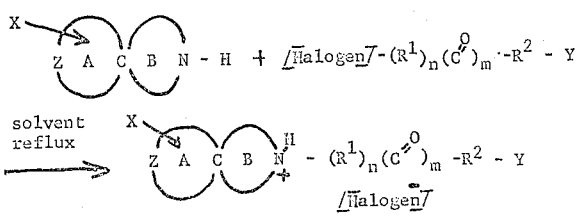

For example, refluxing an omega-haloalkylphenone (such as omega-chloropropiophenone) with a secondary azaspirane base yields the N-substituted azaspirane with a terminal benzoyl or substituted terminal benzoyl group on the side chain.

For some of the more reactive amines, the reflux temperature provided by a benzene medium is sufficient, while for less reactive amines, a higher boiling solvent is desirable to shorten the reaction time. Toluene generally serves as the best medium, the yield being regulated by the reflux time.

This second method of preparation of the azaspirane bases may also be utilized where no carbonyl group is to be present in the ring-B substituent. In such a case, the halogen ester reactant contains no carbonyl group but has a general formula of [Halogen]-$(R^1)_n$—$R^2$—Y. For example, refluxing 3-azaspiro[5.5]undecane in toluene with 2-phenylethyl bromide yields the identical spirane base obtained by the process detailed in Example I(B) below, in the form of the hydrobromide.

It is important to note, however, that in using this second method, "$n$" in —$(R^1)_n$— must be at least 1 when the carbonyl group is not present; "$n$" may be 0–6 when the carbonyl group is present.

Quite obviously, the amine reactants (in the case of the first method set forth above) and the halogen ester (in the case of the second method set forth above) will be chosen depending upon the nature of the ring-B substituent desired. For example, if $R^2$ is to be phenyl, then aniline will be used as the arylamine reactant. If $R^2$ is to be phenyl and "$n$" is to be 2, phenylethylamine may be used as the aralkylamine reactant. If $R^2$ is to be pyridyl, then picolyl

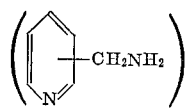

may be used as the aralkylamine reactant.

In addition to the azaspiranes set forth above in Formula 1, the instant invention additionally contemplates the treatment of the basic azaspiranes of Formula 1 to form simple acid addition and quaternary salts. Formulae 2 and 3 illustrate the type and site of salt formation resulting from the appropriate treatment of the azaspirane bases of the present invention:

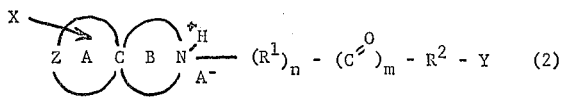

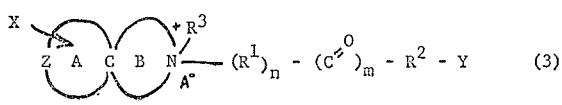

Formula 2 illustrates the simple salt formation resulting from the salting of the tertiary amine nitrogen of ring B of the basic azaspirane with non-toxic acid anions, such as chloride, iodide, bromide, sulfate, acetate, succinate, maleate, phosphate, benzoate, lactate, thiodisalicylate, mucate, citrate, tartrate and the like. In general, those non-toxic salts of the basic azaspiranes which are soluble in water or other well-tolerated solvents are particularly useful for therapeutic purposes due to the ease of administration of the salts in their dissolved form. In addition, other non-toxic salts may also be used.

Formula 3 illustrates quaternary salt formation resulting from quaternizing the ring nitrogen of ring B of the basic azaspiranes with alkyl esters or the like. As illustrated in Formula 3, $R^3$ represents an alkyl, alkoxyalkyl or alkenyl radical of 1 to 22 carbon atoms. The anion, $A^-$, may be any of the non-toxic anions useful in forming the simple acid addition salts as discussed above in connection with Formula 2. In the event that $R^2$ also contains a basic nitrogen atom, the salt resulting from quaternization may be a diquaternary salt.

The compounds of the present invention have been found useful for medicinal purposes. These new azaspirane bases and their acid addition and quaternary salts have marked pharmacological action on the central nervous system. All of the azaspirane bases of the present invention are either stimulants or depressants of the central nervous system, their particular activity depending upon the azaspirane ring size and the nature of the N-substituent. For example, the compound of Example III(C) is a central nervous stimulant in low doses of 5–20 mg. The compounds in which the N-substituent is phenyl or substituted phenyl, benzhydryl or substituted benzhydryl, produce behavioral changes in animals and, in varying degrees, possess tranquilizing properties. The potency of the tranquilizing activity increases with halogen substituents on the aromatic ring. The introduction of a carbonyl group into the N-alkyl side chain also increases potency. For example, the compound of Example I(C) requires approximately 100–200 mg. to produce noticeable effects while the compound of Example VI(C) is more potent. The compound of Example XV requires 20–30 mg. to produce noticeable behavioral changes ("transquilization") while when the compound of Example XVI is employed, the dosage required is only 5–10 mg. Some of the compounds also produce a lowering of blood pressure in the form of their acid addition salts. For example, the compounds of Examples XV and XVI produce such effect.

As noted above, the compound of Example XVI, which is a fluorinated phenone, requires a lesser dosage to obtain tranquilizing effects than does the compound of Example XV, which is an unfluorinated phenone. This increased activity is characteristic not only of the fluorinated phenone of Example XVI, but of a host of fluorinated compounds within the framework of the present invention. More particularly, applicants have discovered that certain of the fluorinated phenones having structures of the type defined in Formula 1 [as well as that of the simple and quaternary salts of Formulae 2 and 3] possess extremely potent central nervous system activity and act as excellent tranquilizers.

The formula of the fluorinated compounds in question is set forth below:

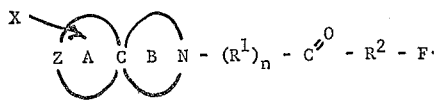 (4)

In this formula, rings A and B, substituent X and constituent Z, and R¹ have the values set forth above in connection with Formula 1, "n" is a number from 1–6, preferably 3 and R² is selected from the group consisting of phenyl and thienyl and their ring-substituted derivatives. As will be noted, the carbonyl group

is always present in this series of compounds.

These fluorinated compounds are potent mental drugs approaching or surpassing the phenothiazines in potency and possessing a longer period of action. While other substituents on the group R² (such as methyl, isopropyl, methoxy, chlorine, bromine and iodine) produce the same essential type of pharmacological action, the fluorinated compounds are much more potent and exhibit a longer period of action.

As part of their central nervous activity, these fluorinated compounds may best be illustrated by selecting the specific compound 3-[3-(p-fluorobenzoyl)propyl]3-azaspiro[5.5]undecane, hydrochloride as representative and comparing its properties with the well-known phenothiazine tranquilizers marketed currently as promazine (Sparine®), and chloropromazine (Compazine®). In comparative tests on Rhesus monkeys, the specific compound recited above was approximately 10 times as potent as promazine and slightly more potent than chloropromazine, while having nearly twice the period of action.

The specific compound mentioned above has been shown to be clinically active in humans at effective dosages of from 100 to 300 micrograms per kilogram. The duration of effect from a single clinically effective dose has been noted up to 48 hours. This potency in a tranquilizing, centrally-acting drug is only approached by known compounds derived from the phenothiazine nucleus such as those used in the comparative tests mentioned above, though, as noted above, they are not as long acting. No other class of centrally acting tranquilizers is known that possesses comparable potency and a large chemotherapeutic index.

The fluorinated compounds of Formula 4 may be prepared by the alternative method previously described for the preparation of the carbonyl-containing compounds of the present invention.

The following examples illustrate the method of preparation of the compounds of the present invention:

EXAMPLE I

A. *3 - (2-phenylethyl)-3-azaspiro[5.5]undecane-2,4-dione.*—20 gm. (0.11 mole) of cyclohexane-1,1-diacetic acid anhydride was placed in a 50 ml. round bottom 24/40 flask and 13.3 gm. (0.11 mole+10% excess) of β-phenylethylamine added in one lot. The reaction was exothermic and the anhydride melted. The mixture was stirred until homogeneous and slowly heated at 240° C. over a period of 1 hour. It was maintained at 240° C. for 20 minutes. (The higher cyclizing temperature has been found advantageous with aralkylamines.) The product was distilled directly from the reaction flask and yielded the title imide (28.7 gm.; 91.4% yield; B.P. 161–163° C./ 0.2 mm.; M.P. 80–82° C.). Recrystallization from acetone-water gave a product with M.P. 82–83° C. With high boiling imides that are medium melting solids, such as that of this example, the distillation is not necessary since the product can be readily isolated by dissolving the entire reaction residue in acetone, decolorizing with a little Norite if necessary and precipitating the filtrate with water.

B. *3-(2-phenylethyl) - 3 - azaspiro[5.5]undecane.*—Reduction of the imide from A in anhydrous ether solution with lithium aluminum hydride yielded the desired aralkyl substituted spirane base. 20 gm. (excess) of lithium aluminum hydride was dissolved in one liter of anhydrous ether in a three-necked reaction flask, fitted with stirrer, dropping funnel and long condenser protected from atmospheric moisture with a calcium chloride tube. Since the aralkyl imides frequently are not very soluble in ether, as in this example, the imide was then dissolved in benzene and added to the ether solution of lithium aluminum hydride. The reducing solution was stirred for four hours and then decomposed by slow dropwise addition of water until hydrogen ceased to be evolved. A slight excess of water was added and the mixture stirred for 4 hours. Inorganic salts were then filtered off on a sintered glass funnel and washed thoroughly with ether. The filtrate was dried overnight by anhydrous sodium sulfate, the solvents stripped and the resultant spirane base distilled in vacuo. From 0.1 mole of imide from A there was obtained 21.4 gm., 83% yield, of the corresponding spirane base [B.P. 119–125° C./0.025 mm.].

C. *Base hydrochloride.*—When 5 gm. of the base from B were dissolved in ethyl acetate and an excess of a saturated solution of HCl in ethanol added, the hydrochloride precipitated (M.P. 328–329° C.). Recrystallization from methanol gave a product with M.P. 329–330° C.

D. *3-methyl - 3-(2-phenylethyl)-3-azaspiro[5.5]undecane, iodide.*—When 5 gm. of the base from B were dissolved in ethyl acetate and a 10% molar excess of methyl iodide added, refluxed for 10 minutes and cooled, the crystalline methonium salt separated (M.P. 217–218° C.). Recrystallization from methanol-ether gave a product with M.P. 218–219° C.

EXAMPLE II

A. *3-[2-(3,4-dimethoxyphenyl)ethyl] - 3 - azaspiro[5.5] undecane-2,4-dione.*—The imide was prepared as described in Example I(A) from 15 gm. (0.08 mole) of cyclohexane-1,1-diacetic acid anhydride and 15 gm. of homoveratrylamine. There was obtained 26 gm. (94% yield) of product with B.P. 210–215° C./0.25 mm.; M.P. 99–100° C. Recrystallization from acetone-water gave a product with M.P. 103–104° C.

B. *3-[2-(3,4-dimethoxyphenyl)ethyl]-3-azaspiro[5.5]-undecane.*—Reduction of 26 gm. of imide from A with lithium aluminum hydride (as described in Example I(B)) yielded the base (21.6 gm.; 91% yield; B.P. 155–158° C./0.12 mm.; M.P. 70–72° C.). Recrystallization from ligroin gave a product with M.P. 73–74° C.

C. *Base hydrochloride.*—Treatment of the base dissolved in ethyl acetate with alcoholic HCl gave the crystalline hydrochloride (M.P. 262–263° C.).

D. *3-methyl-3-[2-(3,4-dimethoxyphenyl)ethyl]-3-azaspiro[5.5]undecane, iodide.*—Treatment of the base in ethyl acetate with methyl iodide, as described in Example I(D), yielded the crystalline methonium salt (M.P. 230–232° C.). Recrystallization from ethanol-ethylacetate gave a product with M.P. 235–236° C.

EXAMPLE III

A. *D-3-[(α-methyl-2-phenyl)ethyl]-3-azaspiro[5.5]undecane-2,4-dione.*—Treatment of 18.2 gm. (0.1 mole) of cyclohexane-1,1-diacetic acid anhydride with 13.5 gm. D-α-methylphenylethylamine (D-amphetamine), as described in Example I(A), gave the desired imide (27.5 gm.; 92% yield; B.P. 158–165° C./0.025 mm.) as a very viscous glass.

B. *D-3- [(α-methyl-2-phenyl)ethyl]-3-azaspiro[5.5]undecane.*—Reduction of the imide from A with lithium aluminum hydride yielded the base in 88% yield (B.P. 125–127° C./0.27 mm.).

C. *Base hydrochloride.*—The base hydrochloride was formed in ethyl acetate with alcoholic-HCl, as in Example I(C) (M.P. 291–292° C.).

D. *Base methiodide.*—The methiodide of the base was formed in ethyl acetate with excess methyl iodide, as in Example I(D) (M.P. 222–223° C.).

EXAMPLE IV

A. *8-(4-isopropylbenzyl) - 8-azaspiro[4.5]decane-2,4-dione.*—Reaction of 10 gm. (0.06 mole) of cyclopentane-1,1-diacetic acid anhydride with 9 gm. of 4-isopropylbenzylamine and cyclizing at 240° C. as described in Example I(A) yielded the title imide (B.P. 160–165° C./0.02 mm.; M.P. 78.5–80.5° C.; 16.5 gm.; 92% yield). Recrystallization from acetone-water gave a melting point of 81–82° C.

B. *8-(4-isopropylbenzyl)-8-azaspiro[4.5]decane.*—The base was obtained by reduction of 16 gm. of the imide from A with 15 gm. lithium aluminum hydride (14 gm.; B.P. 118–122° C./0.13 mm.; 94% yield).

C. *Base hydrochloride.*—Treatment of the base dissolved in absolute ether with gaseous hydrogen chloride yielded the base hydrochloride (M.P. 242–3° C.). Recrystallization from acetone-petroleum ether gave a product with M.P. 243–244° C.

D. *Base methiodide.*—Treatment of the base in ethyl acetate with 10% molar excess of methyl iodide, refluxing 10 minutes, cooling and the addition of ether, gave the crystalline methonium iodide (M.P. 235–236° C.).

E. *Base butyl quaternary iodide.*—Treatment of the base with 10% molar excess of butyl iodide in ethyl acetate, refluxing 1 hour, evaporating ethyl acetate to a small volume, adding petroleum ether to cloudiness and and refrigeration yielded the butyl quaternary salt (M.P. 191–2° C.).

EXAMPLE V

A. *2-(2-methyl-4-methoxyphenyl)- 2-azaspiro[4.5]decane-1,3-dione.*—The imide was obtained by reaction of 10 gm. (0.06 mole) of cyclohexane-1-carboxy-1-acetic anhydride with 9 gm. of 2-methyl-4-methoxy aniline and cyclizing at 240° C. A quantitative yield of product (M.P. 159–164° C.) was obtained. Recrystallization from acetone-water gave a product with M.P. 168–169° C.

B. *2-(2-methyl-4-methoxyphenyl) - 2-azaspiro[4.5]decane.*—The base was obtained by reduction of 16.5 gm. of the imide from A with 15 gm. lithium aluminum hydride (91% yield; B.P. 120–125° C./0.1 mm.).

C. *Base hydrochloride.*—Treatment of the base dissolved in ether with gaseous hydrogen chloride yielded the hydrochloride (M.P. 145–151° C.). Recrystallization from ethyl acetate-petroleum ether gave a product with M.P. 150–151° C.

EXAMPLE VI

A. *2-(2,4-dichlorobenzyl) - 2-azaspiro[4.4]nonane-1,3-dione.*—Reaction of 10 gm. (0.065 mole) of cyclopentane-1-carboxy-1-acetic acid anhydride with 11.5 gm. (0.065 mole) of 2,4-dichlorobenzylamine, as described in Example I(A) yielded the imide (18.5 gm.; 91% yield; B.P. 155–160° C./0.07 mm.; M.P. 70–71° C.). Recrystallization from acetone-water gave a product with M.P. 71–72° C.

B. *2-(2,4-dichlorobenzyl) - 2 - azaspiro[4.4]nonane.*—Reduction of 18 gm. of the imide with lithium aluminum hydride yielded the base (15 gm.; 92% yield; B.P. 100–103° C./0.15 mm.).

C. *Base hydrochloride.*—Treatment of the base from B dissolved in ether with gaseous hydrogen chloride yielded the hydrochloride (M.P. 138–142° C.). Recrystallization from ethyl acetate-petroleum ether gave a product with M.P. 144–145° C.

D. *Base methiodide.*—Treatment of 5 gm. of the base in ethyl acetate with a 10% molar excess of methyl iodide, refluxing 30 minutes and cooling yielded the methiodide (M.P. 159–161° C.). Recrystallization from acetone-ether gave a product with M.P. 163–4° C.

EXAMPLE VII

A. *3-cyclohexyl-3-azaspiro[5.5]undecane - 2,4-dione.*—Reaction of cyclohexylamine with cyclohexane-1,1-diacetic acid anhydride yielded the desired imide (B.P. 138–142° C./0.05 mm.; M.P. 109–110° C.). Recrystallization from methanol gave a product with M.P. 110–111° C.

B. *3 - cyclohexyl-3-azaspiro[5.5]undecane.*—Reduction of the imide from A with lithium aluminum hydride yielded the base (B.P. 188–190° C./19 mm.).

C. *Base hydrochloride.*—Treatment of the base in ethyl acetate with alcoholic HCl yielded the hydrochloride (M.P. 327–328° C.). Recrystallization from methanol gave a product with M.P. 328–329° C.

D. *Base methiodide.*—Addition of excess methyl iodide to the base in ethyl acetate gave the crystalline methiodide (M.P. 258–259° C.).

EXAMPLE VIII

A. *3-cyclopentyl-3-azaspiro[5.5]undecane-2,4-dione.*—The imide was obtained, as in Example VII(A) by reaction of cyclohexane-1,1-diacetic acid anhydride with cyclopentylamine (B.P. 125–135° C./0.05 mm.; M.P. 97–98° C.).

B. *3-cyclopentyl-3-azaspiro[5.5]undecane.*—The base was obtained by reduction of the imide from A, as in Example VII(B) (B.P. 175–176° C./19 mm.).

C. *Base hydrochloride.*—The hydrochloride was obtained as in Example VII(C) (M.P. 314–315° C.).

D. *Base methiodide.*—The methiodide was obtained as in Example VII(D) (M.P. 263–264° C.).

EXAMPLE IX

A. *3-benzyl-3-azaspiro[5.5]undecane-2,4-dione.* — The imide was obtained from the reaction of 18.2 gm. (0.1 mole) of cyclohexane-1,1-diacetic acid anhydride with 11 gm. of benzyl amine (90% yield; B.P. 150–155° C./0.075 mm.; M.P. 61° C.).

B. *3-benzyl-3-azaspiro[5.5]undecane.*—The base was obtained by reduction of the imide from A, as in Example VII(B) (88% yield; B.P. 100–106° C./0.05 mm.).

C. *Base hydrochloride.*—Treatment of the base dissolved in ethyl acetate with excess alcoholic-HCl and precipitation with ether yielded the hydrochloride (M.P. 261–3° C.). Recrystallization from ethanolether gave a product with M.P. 262–3° C.

D. *Base methiodide.*—Treatment of the base in ethyl acetate with 10% molar excess of methyl iodide, refluxing 10 minutes, cooling and adding ether gave the methonium salt (M.P. 240–2° C.). Recrystallization from ethanol-ether gave a product with M.P. 242–4° C.

EXAMPLE X

*3-cyclohexylmethyl-3-azaspiro[5.5]undecane.*—When 5 gm. of the hydrochloride of 3-benzyl-3-azaspiro[5.5]undecane obtained in Example IX(C) were dissolved in 50 ml. of 1:1 ethanol-water containing 2 ml. of concentrated hydrochloric acid and hydrogenated over platinum oxide in a Parr low pressure hydrogenator overnight, its phenyl group was reduced to cyclohexyl. The catalyst was filtered out and the filtrate stripped to dryness. The salt was dissolved in anhydrous ethanol and absolute ether added. The crystalline hydrochloride of the title base was obtained (M.P. 335° C.). The melting point varied with time of heating and a melting point of 335° C. is obtained by placing the material in the oil bath above 300° C. Infra-red spectra confirmed the absence of carbon-carbon double bonds and the reduction of the phenyl group to cyclohexyl.

EXAMPLE XI

A. *Spiro-trans-decalin-(2:4')-1' - (4 - methylbenzyl)-piperidine-2',6'-dione.*—Reaction of 48 gm. (0.203 M) of trans-beta-decalin-2,2-diacetic acid anhydride with 25.5 gm. of 4-methylbenzylamine (0.211 mole) and cyclization at 240° C. for 1 hour yielded the title imide (58 gm.; 84% yield; B.P. 210–215° C./0.1 mm.).

B. *Spiro-trans-decalin-(2:4')-1' - (4 - methylbenzyl)-piperidine.*—Reduction of 20 gm. (0.06 M) of the imide from A with 20 gm. of lithium aluminum hydride yielded the spirane base (15.5 gm.; 85% yield; B.P. 172–178° C./0.1 mm.).

C. *Base hydrochloride.*—5 gm. of the base from B treated in ether with gaseous hydrogen chloride yielded the desired hydrochloride (M.P. 285–288° C.). Recrystallization from ethanol-ether gave a product with M.P. 289° C.

D. *Base methiodide.*—5 gm. of the base from B treated with a 10% molar excess of methyl iodide and refluxed in ethyl acetate for ½ hr. yielded the desired methonium salt (M.P. 218–220° C.). Recrystallization from ethanol-ether gave a product with M.P. 220–221° C.

EXAMPLE XII

A. *2-(2-chlorobenzyl)-8 - t - butyl - 2 - azaspiro[4.5]-decane-1,3-dione.*—The imide was obtained by reaction of 13.5 gm. (0.06 M) of 4-t-butylcyclohexane-1-carboxy-1-acetic acid anhydride with 9.2 gm. (0.065 M) of 2-chlorobenzylamine and cyclization at 240° C. for 1 hour. A quantitative yield of the title imide was obtained (M.P. 140–145° C.). Recrystallization from acetone-water raised the M.P. to 147–148° C.

B. *2-(2-chlorobenzyl)-8-t-butyl - 2 - azaspiro - [4.5]-decane.*—The base was obtained by reduction of the imide from A with lithium aluminum hydride in 94% yield and boiled at 140–144° C./0.04 mm.

C. *Base hydrochloride.*—The hydrochloride was obtained by dissolving the base in anhydrous ether and bubbling in hydrogen chloride (M.P. 192–198° C.). Recrystallization from acetone-petroleum ether gave a product with M.P. 196–198° C.

D. *2-methyl-2-(2-chlorobenzyl)-8-t-butyl-2 - azaspiro-[4.5]decane, iodide.*—Solution of the base in ethyl acetate and refluxing 20 minutes with excess methyl iodide yielded the crystalline methonium salt (M.P. 190–193° C.). Recrystallization from acetone-ether gave a product with M.P. 196–197° dec.

EXAMPLE XIII

A. *2-(3-pyridylmethyl)-2-azaspiro[4.4]nonane-1,3 - dione.*—Reaction of 20 gm. (0.13 mole) of cyclopentane-1-carboxy-1-acetic acid anhydride with 15 gm. of 3-aminomethylpyridine (3-picolylamine), followed by ring closure at 240° C. and vacuum distillation, yielded the imide (B.P. 140–145° C./0.1 mm.; M.P. 57–58°; 94% yield).

B. *Imide hydrochloride.*—The imide hydrochloride was prepared by bubbling gaseous hydrogen chloride into an ethereal solution of the imide (M.P. 182–3° C.).

C. *Imide methiodide.*—The imide methiodide was prepared by refluxing a solution of the imide in ethyl acetate with a 10% molar excess of methyl iodide, cooling and adding ether (M.P. 149–150° C.).

D. *2-(3-pyridylmethyl)-2 - azaspiro[4.4]nonane.*—Reduction of 20 gm. of the imide from A with lithium aluminum hydride yielded the corresponding azaspirane base (B.P. 90–92° C./0.1 mm.; 89% yield).

E. *Base dihydrochloride.*—The base dihydrochloride was prepared in ether with gaseous hydrogen chloride (M.P. 238–240° C. subl.).

F. *Base dimethiodide.*—The dimethonium salt was prepared in ethyl acetate with methyl iodide (M.P. 180–182° C.).

EXAMPLE XIV

A. *2-(2-tetrahydropyranomethyl)-2 - azaspiro[4.4]nonane-1,3-dione.*—Reaction of 1/10 molar quantities of cyclopentane-1-carboxy-1-acetic anhydride and 2-aminomethyltetrahydropyrane and cyclization at 180–200° C. yielded the imide (B.P. 120–125° S./0.03 mm.; M.P. 27–28° C.; 95% yield).

B. *2-(2-tetrahydropyranomethyl) - 2 - azaspiro[4.4]nonane.*—Reduction of 19 gm. of the imide from A with lithium aluminum hydride gave the base (B.P. 70–71° C./0.08 mm.; 93% yield).

C. *Base dihydrochloride.*—The dihydrochloride was prepared as in Example XIII(E) (M.P. 178–180° C.).

D. *Base dimethiodide.*—The dimethiodide was prepared as in Example XIII(F) (M.P. 68–70° C.).

EXAMPLE XV

*3-(3-benzoylpropyl)-3 - azaspiro[5.5]undecane, hydrochloride.*—15.3 gm. (0.1 M) of 3-azaspiro[5.5]undecane was placed in 100 ml. of toluene and 9.1 gm. (0.05 M) of gamma-chlorobutyrophenone added. The mixture was heated on a water bath at 100° C. for 2–3 days (40–70 hours). On coding, 3-azaspiro[5.5]undecane hydrochloride was removed by filtration. The filtrate was refluxed for 3–4 hours, cooled and washed several times with water. The toluene solution was dried overnight with anhydrous sodium sulfate, filtered and treated with gaseous hydrogen chloride. The title compound was removed by filtration and melted at 218–221° C. On recrystallization from acetone-petroleum ether or water, it melted at 223–224° C.

EXAMPLE XVI

*3-[3-(p-fluorobenzoyl)propyl] - 3 - azaspiro[5.5]undecane, hydrochloride.*—The title compound was prepared in a manner analogous to that described in Example XV from 3-azaspiro[5.5]undecane and gamma-chloropropyl-4'-fluorophenyl ketone and melted at 247–249° C. On recrystallization from acetone-petroleum ether or water it melted at 256–257° C.

EXAMPLE XVII

*3-(4-chlorobenzhydryl)-3 - azaspiro[5.5]undecane, hydrochloride.*—Ten gm. (0.05 M) of p-chlorobenzhydryl chloride, dissolved in 100 ml. of dry toluene, was added dropwise with stirring to a refluxing mixture of 7.5 gm. (0.05 M) of 3-azaspiro[5.5]undecane and 7.5 gm. of anhydrous sodium carbonate in 45 ml. of dry toluene. After addition was completed the mixture was refluxed for 2½ days. The reaction mixture was cooled and washed with water. The toluene solution was extracted several times with dilute aqueous hydrochloric acid. The precipitate that formed was collected and dried. It melted at 279–281° C. On recrystallization from methanolacetone or methanol-water, the product melted at 285–286° C.

EXAMPLE XVIII

A. *3-[3-(p-fluorobenzoyl)propyl]-8-methyl-3 - azaspiro[5.5]undecane.*—Sixteen and seven-tenths grams (0.1 mole) of 8-methyl-3-azaspiro[5.5]undecane and 10 grams (0.05 mole) of gamma-chloro-p-fluorobutyrophenone were placed in a 300 ml. boiling flask and 100 ml. of dry toluene and 0.1 gm. of potassium iodide added. The whole was gently refluxed for 24 hours while protected from atmospheric moisture and carbon dioxide by a tube filled with a mixture of calcium chloride and soda-lime. The reaction mixture was cooled and diluted with an equal volume of ether. After being permitted to cool in the refrigerator, the 8-methyl-3-azaspiro[5.5]undecane hydrochloride formed during the reaction was removed by filtration and washed several times with ether. The filtrate and ether washing were combined and all solvents stripped off at the water pump. The residual reddish oil was distilled in vacuo and yielded the title compound as a pale yellow oil (14.5 gm.; 87% yield; B.P. 150–160° C./0.2 mm.).

B. *The hydrochloride.*—The hydrochloride salt was formed by dissolving the base in ether and passing in gaseous hydrogen chloride. The hydrochloride readily precipitated and after adding an equal volume of petroleum ether (B.P. 30–60° C.), it settled rapidly and was filtered off. The product thus obtained melted at 241–243° C. On recrystallization from acetone-ether, methanol-ether or water it melted at 244–245° C.

C. *The methiodide.*—The methiodide was prepared by refluxing the base for 10 minutes with a 10% molar excess of methyl iodide in ethyl acetate. The reaction mixture was cooled and diluted with ether. The methiodide was removed by filtration and melted at 203–205° C. Recrystallization from acetone-ether raised the melting point to 205–206° C.

EXAMPLE XIX

*3-[3-(p-fluorobenzoyl)propyl]-9-tertiary butyl - 3 - azaspiro[5.5]undecane.*—When 20.9 gm. (0.1 mole) of 9-t-butyl-3-azaspiro[5.5]undecane was refluxed in toluene or benzene overnight with 0.05 mole of gamma-chloro-p-fluorobutyrophenone, as described in Example XVIII, 95% of the theoretical quantity of 9-t-butyl-3-azaspiro [5.5]undecane hydrochloride was removed by filtration. On stripping the solvents and starting vacuum distillation, slight decomposition of the product started as it distilled over at 170–180° C./0.2 mm. The distillation was discontinued and the residue diluted to 500 ml. with ether and treated with gaseous hydrogen chloride. The distillate solidified and melted at 86–90° C. Recrystallization from acetone-water gave a melting point of 91–92° C. for the free base. The overall yield was 80%.

EXAMPLE XX

*2-[3-(p - fluorobenzoyl)propyl] - 2 - azaspiro[4.4]nonane.*—Reaction of 12.5 gm. (0.1 mole) of 2-azaspiro [4.4]nonane with 10 gm. (0.05 mole) of gamma-chloro-p-fluorobutyrophenone under gentle reflux in toluene as described in Example XVIII, cooling, adding ether and removing the 2-azaspiro[4.4]nonane, hydrochloride, stripping and distilling in vacuo, yielded the title base (9.5 gm.; 63% yield) as a pale yellow oil (B.P. 133–137° C./0.25 mm.).

EXAMPLE XXI

*2-[3(p-fluorobenzoyl)propyl] - 2 - azaspiro[4.6]undecane.*—Reaction of 2-azaspiro[4.6]undecane with gamma-chloro-p-fluorobutyrophenone in toluene as described in Example XVIII yielded the title base as a pale yellow oil (B.P. 155–165° C./0.2 mm.).

EXAMPLE XXII

*3-[3-(2 - thienoyl)propyl]3 - azaspiro[5.5]undecane.*—Reaction of 16.3 gm. (0.106 mole) of 3-azaspiro [5.5]undecane with 10 gm. (0.053 mole)gamma-chloro-2-thienylpropyl ketone in toluene as described in Example XVIII yielded on vacuum distillation 14 gm. of the title compound (86% yield; B.P. 160–170° C./0.2 mm.).

EXAMPLE XXIII

*3 - [3 - (p-fluorobenzoyl)propyl]-3 - azaspiro[4.5]decane.*—This was prepared in a manner analogous to that described in Example XVIII in 72% yield using 0.1 molar quantity of the amine. The free base melted at 61–62° C. and on recrystallization from ligroin at 64–65° C. and boiled at 143–146° C./0.17 mm.

EXAMPLE XXIV

*2-[3-(p-fluorobenzoyl)propyl]2-azaspiro[4.5]decane.*—This compound was prepared as described in Example XVIII in 60% yield using 0.063 molar quantity of the amine and boiled at 135–140° C./0.15 mm.

EXAMPLE XXV

*Spiro-trans-decalin - 2,4'-piperidine - [1'-(p-fluorobenzoyl)propyl].*—Reaction of 10.5 gm. (0.05 mole) of spiro-trans-decalin-2,4'-piperidine with 5.1 gm. (0.025 mole) of gamma-chloro-p-fluorobutyrophenone in toluene for 24 hours gave 6.0 gm. (as compared to 6.09 gm. theoretical) of spiro-trans-decalin-2,4'-piperidine hydrochloride (M.P. 273–274° C. dec.). The reaction mixture was diluted to 500 ml. with ether and gaseous hydrogen chloride passed in. The hydrochloride of the title compound separated as a flocculant nebulous mass that was very difficult to filter and retained solvents tenaciously. On drying for several days at 90° C. in an air oven it melted at 246–248° C. Two recrystallizations from acetone-ether gave the hydrochloride of the title base (M.P. 248–249° C.).

EXAMPLE XXVI

*2-[3-(p-fluorobenzoyl)propyl] - 7,9 - dimethyl-8-oxa-2-azaspiro[4.5]decane.*—Reaction of 16.9 gm. (0.1 mole) of 7,9-dimethyl-8-oxa-2-azaspiro[4.5]decane with gamma-chloro-p-fluorobutyrophenone in toluene as described in Example XVIII and vacuum distillation yielded the title base (12 gm.; 72% yield; B.P. 130–140° C./0.1 mm.).

EXAMPLE XXVII

*3-[3-(p-methoxybenzoyl)propyl] - 3 - azaspiro[5.5]undecane.*—Reaction of 15.3 gm. (0.1 mole) of 3-azaspiro [5.5]undecane with 10.6 gm. (0.05 mole) of gamma-chloro-p-methoxybutyrophenone in toluene as described in Example XVII, removal of the 3-azaspiro[5.5]undecane hydrochloride by filtration, dilution to 500 ml. with ether and passing in gaseous hydrogen chloride, yielded the title compound as the hydrochloride (M.P. 218–220° C.). Recrystallization from acetone-ether gave a M.P. of 221–222° C.

The foregoing examples are by no means intended to be restrictive but are illustrative only of the operative procedures attendant the preparation of the compounds of the present invention. Numerous other examples could be cited by way of illustration. For instance, reaction of the anhydride of cycloheptane-1-carboxy-1-acetic acid with cyclooctylamine and cyclization at 220° C. yielded the corresponding 2-cyclooctyl-2-azaspiro-[4.6]undecane-1,3-dione (B.P. 170–175° C./0.025 mm.; M.P. 64–65° C.) and reduction yielded the 2-cyclooctyl-2-azaspiro-[4.6]undecane (B.P. 111–114° C./0.15 mm.). For variation, the decyl iodide (M.P. 59–61° C.) of the free base was formed. Similarly, 2-(2-furylmethyl)-2-azaspiro [4.4]nonane-1,3-dione and its corresponding base and acid addition and quaternary salts have been prepared. Examples of other compounds which may be made are 2-phenylethyl-2-azaspiro[4.14]nonadecane; 2-phenylethyl-2-azaspiro[4.19]tetracosane; 2 - benzhydryl-2-azaspiro [4.4]nonane; 2-(3 - phenylpropyl)-7,9-dimethyl-8-oxa-2-azaspiro[4.5]decane; and 2-(2-phenylethyl)-7-thia-2-azaspiro[4.4]nonane.

Examples of azaspiranes that may be used in the synthesis of compounds of this invention by the alternate method described above are: 2-azaspiro[4.4]nonane; 2-azaspiro[4.5]decane; 3-azaspiro[4.5]decane; 2-azaspiro [4.6]undecane; 3 - azaspiro[5.6]dodecane; 2 - azaspiro [4.14]nonadecane; 7-methyl - 2 - azaspiro[4.4]nonane; 8-methyl-3-azaspiro[5.5]undecane; 9 - t - butyl - 3 - azaspiro [5.5]undecane; 7,9-dimethyl - 8 - oxa-2-azaspiro[4.5]decane; 8-oxa-7,9-dimethyl-2-azaspiro[4.5]decane; 8,10-dimethyl-9-oxa-3-azaspiro[5.5]undecane; 8-thia-2-azaspiro [4.5]decane; 7-thia-2-azaspiro[4.4]nonane; 8-oxa-2-azaspiro[4.4]nonane; and other amines disclosed in applicants' copending application Serial No. 95,042, filed March 13, 1961, which is now abandoned. Examples of ketones that may be employed in said alternate method are: gamma-chloro-butyrophenone; gamma-chloro-4'-fluorobutyrophenone; gamma-chloro - 4' - chlorobutyrophenone; gamma - chloro-4'-bromobutyrophenone; gamma-chloro-4'-methylbutyrophenone; gamma - chloro-4'-ethylbutyrophenone; gamma - chloro - 4' - isopropylbutyrophenone; gamma-chloro-4'-methoxybutyrophenone; gamma-chloro-4'-t-butylbutyrophenone; -gamma-chloro - 2',4'-dimethylbutyrophenone; gamma - chloro - butyrothienone; gamma-chloro-3-fluoro-butyrothienone; etc.

While, as above stated, values of $R^2$ are not limited other than by the broad descriptions set forth, preferable values of R in the heterocyclic aryl form are pyridyl, thienyl, furyl and quinolyl.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A compound selected from the group consisting of (1) a compound of the formula:

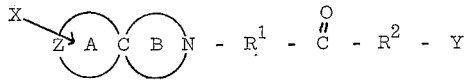

wherein ring A is selected from the group consisting of decalin and monocyclic rings 5 to 15 of ring atoms, the ring atoms of ring A other than Z being carbon; X is selected from at least one of the group consisting of hydrogen, lower alkyl, lower alkenyl and lower alkoxy; Z is selected from the group consisting of carbon, oxygen and sulfur; ring B is a saturated ring of 5 to 6 ring atoms, one of which is nitrogen and the rest of which are carbon, the nitrogen atom being at least one carbon atom removed from the spiro carbon atom joining rings A and B; $R^1$ is selected from the group consisting of lower alkylene and lower alkenylene; $R^2$ is selected from the group consisting of cycloalkyl of up to 8 ring atoms, phenyl, pyridyl, furyl, thienyl and quinolyl; and Y is selected from the group consisting of lower alkyl, lower alkenyl, lower alkoxy, hydrogen and the halogens; (2) the pharmaceutically acceptable non-toxic acid addition salts of (1); and (3) the pharmaceutically acceptable non-toxic quarternary salts of (1) of the formula:

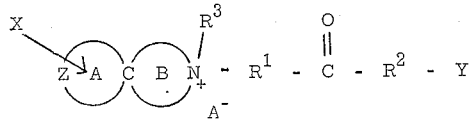

wherein $R^3$ is selectetd from the group consisting of alkyl, alkoxyalkyl, and alkenyl of 1–22 carbon atoms, $A^-$ is a pharmaceutically acceptable non-toxic anion, and X, Z, rings A and B, $R^1$, $R^2$ and Y have the values set forth above.

2. 3-[3 - (p - fluorobenzoyl)propyl] - 3 - azaspiro[5.5] undecane.
3. 3-[3-(p-fluorobenzoyl)propyl] - 8-methyl-3-azaspiro [5.5]undecane.
4. 3-[3-(p - fluorobenzoyl)propyl] - 9 - tertiarybutyl-3-azaspiro[5.5]undecane.
5. 2-[3 - (p - fluorobenzoyl)propyl] - 2 - azaspiro[4.6] undecane.
6. Spiro-trans-decalin - 2,4' - piperidine[1'(p-fluorobenzoyl)propyl].
7. 2 - [3 - (p-fluorobenzoyl)propyl] - 7,9-dimethyl - 8-oxa-2-azaspiro[5.4]decane.

References Cited by the Examiner

UNITED STATES PATENTS

| 2,814,622 | 11/1957 | Moffet | 260—243 |
| 2,967,182 | 1/1961 | Pohland | 260—295 |
| 2,971,961 | 2/1961 | Moffet | 260—313 |
| 3,025,294 | 3/1962 | Huebner | 260—247.5 |
| 3,029,236 | 4/1962 | Staeuble et al. | 260—249.5 |
| 3,106,552 | 10/1963 | Grogan et al. | 260—247.2 |

FOREIGN PATENTS

| 1,187,131 | 3/1959 | France. |
| 881,894 | 11/1961 | Great Britain. |

OTHER REFERENCES

Chemical Abstracts: The Naming and Indexing of Chemical Compounds by Chemical Abstracts (Introduction to the 1945 Subject Index), page 5877, Washington, D.C., American Chemical Society, 1953.

Patterson: The Ring Index, 2nd ed., pages 169, 179, and 185, Washington, Amer. Chem. Soc., 1960.

Patterson et al.: The Ring Index, 2nd ed., pages 73, 136, 176, 186, 190, 192, 247–8, and 254–5, Washington, D.C., American Chemical Society, 1960.

WALTER A. MODANCE, *Primary Examiner.*

IRVING MARCUS, NICHOLAS S. RIZZO,
*Examiners.*

UNITED STATES PATENT OFFICE
CERTIFICATE OF CORRECTION

Patent No. 3,238,217                      March 1, 1966

Charles H. Grogan et al.

It is hereby certified that error appears in the above numbered patent requiring correction and that the said Letters Patent should read as corrected below.

Column 10, line 11, for "coding" read -- cooling --; column 13, line 13, for "5 to 15 of" read -- of 5 to 15 --.

Signed and sealed this 31st day of January 1967.

(SEAL)
Attest:

ERNEST W. SWIDER                      EDWARD J. BRENNER
Attesting Officer                        Commissioner of Patents